United States Patent
Ranmuthu et al.

(10) Patent No.: US 6,490,112 B1
(45) Date of Patent: Dec. 3, 2002

(54) SUPPLY AND METHOD FOR PROVIDING DIFFERENTIAL POSITIVE SUPPLY VOLTAGES TO A LOAD WITH REDUCED COMMON MODE VOLTAGES

(75) Inventors: Indumini W. Ranmuthu, Plano, TX (US); Reza Sharifi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 14 days.

(21) Appl. No.: 09/682,320

(22) Filed: Aug. 20, 2001

(51) Int. Cl.⁷ .................................................. G11B 5/03
(52) U.S. Cl. ........................ 360/66; 360/46; 360/67; 327/538; 330/261
(58) Field of Search .......................... 360/66, 46, 67; 327/54, 538; 330/261, 252, 265, 267, 270, 273, 290

(56) References Cited

U.S. PATENT DOCUMENTS

| | | | |
|---|---|---|---|
| 5,309,295 A | * | 5/1994 | Bailey et al. .................. 360/66 |
| 6,222,415 B1 | * | 4/2001 | Umeyama et al. ............. 360/67 |
| 6,252,457 B1 | * | 6/2001 | Umeyama et al. ............. 360/67 |

* cited by examiner

*Primary Examiner*—Alan T. Faber

(57) ABSTRACT

A circuit (50) and method are presented to provide positive biasing voltages to an MR head (18) in a mass data storage device (10). The circuit (50) includes upper (56) and lower (62) driver transistors to respectively bias respective opposite ends of the MR head (18) with positive voltages. A feedback circuit (58,60,74,84) controls a lower voltage (63) of the positive voltages to be a value as close as possible to a saturation voltage of the lower driver transistor (62), without causing the lower transistor (62) to saturate. Since the MR head (18) is connected between the upper (56) and lower (62) driver transistors, maintaining the lower voltage (63) just above the saturation voltage of the lower driver transistor (62) reduces the common mode voltage across the MR head (18) to a minimum value.

19 Claims, 1 Drawing Sheet

SUPPLY AND METHOD FOR PROVIDING DIFFERENTIAL POSITIVE SUPPLY VOLTAGES TO A LOAD WITH REDUCED COMMON MODE VOLTAGES

BACKGROUND OF INVENTION

1. Field of Invention

This invention relates in one aspect to improvements in electrical power supplies and power supply techniques, and more particularly, to improvements in electrical power supplies and techniques to supply differential positive voltages to loads with reduced common mode voltages. This invention relates in another aspect to improvements in mass data storage devices and methods for operating same using the improved positive differential voltage power supply.

2. Relevant Background

Although this invention is described in the environment of mass data storage devices, it should be noted that the application of the invention has broader applications. In particular, the invention may be used in any application in which a positive only supply voltage is required. Still more particularly, in many differential amplifier or differential architecture applications, usually both positive and negative supply voltages are required to properly bias the amplifier. If positive only voltages are supplied, in the past, the common mode voltage (the average of the differential input voltages) was unacceptably high. If the common mode voltage is too high, in the mass data storage device environment, spikes and other undesirable signal aberrations may occur.

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives still being developed, and are expected to further increase in the future.

Mass data storage devices may also include optical disks in which the optical properties of a spinning disk are locally varied to provide a reflectivity gradient that can be detected by a laser transducer head, or the like. Optical disks may be used, for example, to contain data, music, or other information.

In some mass data storage devices magneto-resistive heads are employed. A magneto-resistive head is a data transducer that changes resistance when it is exposed to changes in magnetic fields in proximity to the head. A bias voltage is applied to the head, usually by a differential amplifier, and, ideally, the common mode voltage is set at or near ground, or zero volts. However, in the past, this has not been practically achievable.

What is needed, therefore, is a circuit and technique for providing a differential, positive only power supply that can be used, for example, to bias an MR head of a mass data storage device, with a common mode voltage is set at or near ground, or zero volts.

SUMMARY OF INVENTION

In light of the above, it is, therefore, an object of the invention to provide a circuit and method for providing a positive voltage supply to a preamplifier.

It is an advantage of the invention that the circuit and method presented eliminate the need for an expensive negative voltage regulator.

It is another advantage of the invention that common mode head bias in mass data storage device implementations can be kept at relatively low levels.

It is another advantage of the invention that a positive only power supply that can be provided, for example, to bias an MR head of a mass data storage device, with a common mode voltage is set at or near ground, or zero volts.

According to a broad aspect of the invention, a circuit is presented to provide positive biasing voltages to a biased element, such as an MR head in a mass data storage device, or the like. The circuit includes upper and lower driver transistors to respectively bias respective opposite ends of the biased element with positive voltages. A feedback circuit controls a lower voltage of the positive voltages to be a value as close as possible to a saturation voltage of the lower driver transistor, without causing the lower transistor to saturate.

According to another broad aspect of the invention, circuit is presented to provide positive biasing voltages to a biased element. The circuit includes a differential amplifier having first and second driver transistors connected in series on respective opposite sides of the biased element between a positive voltage supply and a ground potential. An upper current mirror circuit is connected such that the first driver transistor mirrors a fixed drive current through the biased element. A lower mirror circuit is connected such that the second driver transistor mirrors a variable reference current therethrough. A feedback circuit is connected to control the variable reference current to maintain voltages across the second transistor that are just above a saturation voltage thereof.

According to yet another broad aspect of the invention, a circuit is presented to provide positive biasing voltages to a biased element. The circuit includes means for biasing the biased element. The means for biasing the biased element includes first and second switching means connected in series on respective opposite sides of the biased element between a positive voltage supply and a ground potential and means for mirroring a fixed drive current through the biased element. Means are provided for mirroring a variable reference current in a second switching means. Feedback means are connected to control the variable reference current to maintain voltages across the second switching means that are just above a saturation voltage of the second switching means.

According to still another broad aspect of the invention, a mass data storage device is provided. The mass data storage device includes an MR head and a differential amplifier having first and second driver transistors connected in series on respective opposite sides of the MR head between a positive voltage supply and a ground potential. An upper current mirror circuit is connected such that the first driver transistor mirrors a fixed drive current through the biased element. A lower mirror circuit is connected such that the second driver transistor mirrors a variable reference current therethrough. A feedback circuit is connected to control the variable reference current to maintain voltages across the second transistor that are just above a saturation voltage thereof.

According to yet another broad aspect of the invention, a method is presented for providing positive biasing voltages to a biased element. The method includes biasing respective opposite ends of the biased element with positive voltages, and feeding back a lower voltage of the positive voltages maintain a the lower voltage at a value as close as possible to a saturation voltage of a transistor for biasing the biased element, without causing the transistor to saturate.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
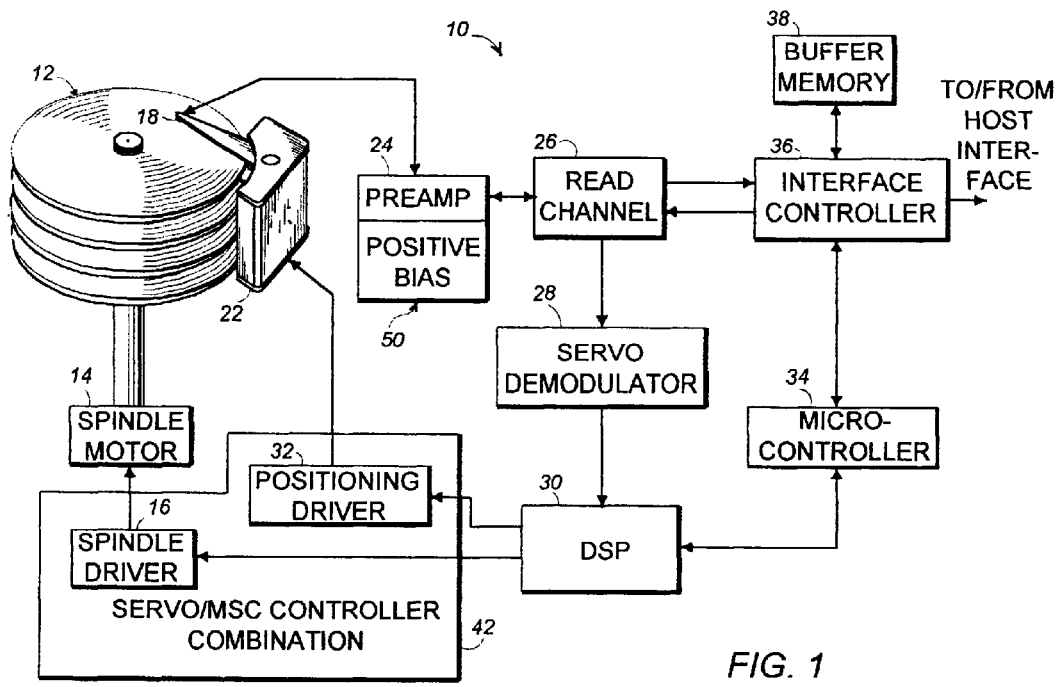
FIG. 1 is a block diagram of a generic disk drive system, illustrating the general environment in which the invention may be practiced.

FIG. 1 is a block diagram of a generic disk drive system 10, which represents the general environment in which the invention may be practiced. The system 10 includes a magnetic media disk 12 that is rotated by a spindle motor 14 and spindle driver circuit 16. A data transducer or head 18 is locatable along selectable radial tracks (not shown) of the disk 12 by a voice coil motor 22. The radial tracks may contain magnetic states that contain information about the tracks, such as track identification data, location information, synchronization data, as well as user data, and so forth. The head 18 is used both to record user data to and read user data back from the disk 12, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

Figure 2:
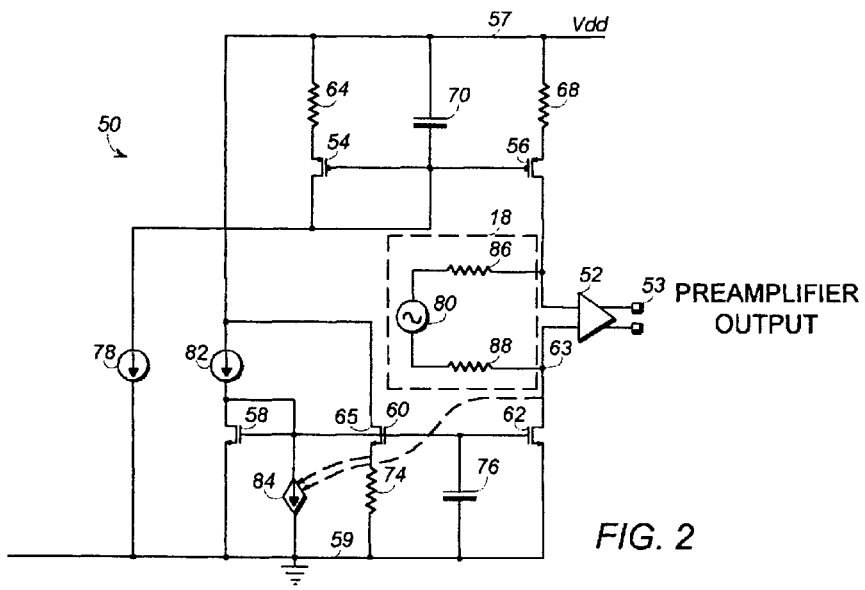
FIG. 2 is an electrical schematic diagram showing an embodiment of the differential reader, in accordance with a preferred embodiment of the invention.

According to a preferred embodiment of the invention, a circuit 50 is provided to provide a positive supply to the preamplifier 24. The supply circuit 50 is shown in FIG. 2, to which reference is now additionally made. The circuit 50 includes two PMOS transistors 54 and 56 connected by resistors 64 and 68 to a power supply line, $V_{dd}$, 57. The gates of the PMOS transistors 54 and 56 are connected to each other and to the supply line 57 by a capacitor 70. The gates of the PMOS transistors 54 and 56 are also connected to a reference potential or ground line 59 by a current source 78.

The source of the PMOS transistor 54 is also connected back to the gates of the PMOS transistors 54 and 56. The source of PMOS transistor 56 is connected to one side of a differential gain amplifier 52, the output of which is provided on output pads 53. As a result, the PMOS transistors form a current mirror, in which the current in PMOS transistor 54 established by current source 78 is mirrored in the current path including the PMOS transistor 56 through the head 18, described below.

NMOS transistors 58, 60, and 62 are provided, with their gates being interconnected, as shown, to establish the voltage at the bottom end of the head 18 on node 63. The drain of NMOS transistor 58 is connected to the power supply line 57 by a current source 82. The drain of the NMOS transistor 58 is connected also to its gate. The drain of NMOS transistor 60 is connected directly to the power supply line 57, and the source thereof is connected to the ground line 57 by a resistor 74. Finally, the drain of NMOS transistor 62 is connected to a second input of the differential gain amplifier 52, and the source of the NMOS transistor 62 is connected to the ground line 59. A dependent current source 84 is connected between the gates of NMOS transistors 58, 60, and 62 and the ground line 59. In addition, a capacitor 76 is connected in parallel with the dependent current source 84 between the gates of the transistors 58, 60, and 62 and the ground line 59.

In the circuit 50, the MR head is modeled as resistors 86 and 88, together with an AC power source 80. The MR head is connected to the inputs of the differential gain amplifier 52 in parallel with the remainder of the circuit 50 described above, as shown.

In operation, as mentioned, it is desirable to set the lowest voltage on the head at node 63 as close to ground or zero volts as possible. However, the lowest voltage possible in the circuit is one $V_t$ below the gate voltage of NMOS transistor 62, because otherwise NMOS transistor 62 would saturate. This is accomplished by NMOS transistor 60, which is connected between the supply rail 57 and ground line 59. NMOS transistor 60 draws very little current. As a result, the source of NMOS transistor 60 on node 65 would be very close to its gate voltage minus $V_t$. It should be noted that the threshold voltage $V_t$ is both temperature and process dependent. As a result, the NMOS transistor 60 is necessary to establish the threshold voltage in order that the voltage on node 63 can be set to the desired low value. To do this, all three NMOS transistors 58, 60, and 62 should be constructed to be substantially the same size.

Thus, the gate voltage on NMOS transistor 60 is established by the dependent current source 84 to be one $V_t$ higher than node 63. That is, dependent current source 84 depends on the voltage difference between node 63 and node 65 on the source of NMOS transistor 60. The goal is to pull the voltage of node 63 to the voltage of node 65, which is just on the edge of saturation of NMOS transistor 62. Thus, the current flowing through NMOS 58 is established by the difference between the current in current source 82 and the current in dependent current source 84. This current is mirrored by NMOS 62, which is made as large as possible consistent with the bandwidth needed. It should be noted that since the current through the NMOS transistor 62 is the same as the current through the PMOS transistor 56, the upper PMOS transistors 54 and 56 should also be made large. Making the upper PMOS transistors 54 and 56 large helps to reduce the noise generated by the differential transistors 56 and 62. By making the PMOS transistors 54 and 56 large, the gate voltage of 62 is reduced. Consequently, the common voltage is reduced; however, the bandwidth of the circuit is also reduced. Therefore, the exact size of the transistors depends on required noise/bandwidth figures, as well as technology used and the maximum head common mode voltage.

It is noted that the head is connected between the drains of NMOS transistors 56 and 62. As a result, without some means of controlling the voltage on node 63, it would be subject to the common mode voltage between the NMOS transistors 56 and 62, which would be undesired. By virtue of the feedback circuit of the invention, the common mode voltage of the head 18 is set as close as possible to ground.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit to provide positive biasing voltages to a biased element, comprising:

upper and lower driver transistors to respectively bias respective opposite ends of said biased element with positive voltages;

a feedback circuit to control a lower voltage of said positive voltages to be a value as close as possible to a saturation voltage of said lower driver transistor, without causing said lower transistor to saturate;

a resistor connected to receive a current from a first of said pair of transistors to provide a reference voltage thereacross, a current source connected to drive current through a second of said pair of transistors, and a dependent current source connected to pull current from gates of said lower driver transistor and said pair of transistors, in dependence upon a voltage difference between said lower voltage and said reference voltage.

2. The circuit of claim 1 further comprising a circuit biasing transistor and a current source to establish a current through said biasing transistor, said biasing transistor being connected to mirror a current into said upper driver transistor to establish a fixed current through said biased element.

3. The circuit of claim 1 wherein said feedback circuit comprises a pair of transistors connected to mirror a current into said lower driver transistor to maintain said lower voltage.

4. The circuit of claim 1 wherein said pair of transistors are constructed similarly to said lower driver transistor.

5. The circuit of claim 1 wherein said upper and lower driver transistors are PMOS and NMOS devices, respectively.

6. The circuit of claim 1 wherein said biased element is an MR head.

7. A circuit to provide positive biasing voltages to a biased element, comprising:

a differential amplifier having first and second driver transistors connected in series on respective opposite sides of said biased element between a positive voltage supply and a ground potential;

an upper current mirror circuit connected such that said first driver transistor mirrors a fixed drive current through said biased element;

a lower mirror circuit connected such that said second driver transistor mirrors a variable reference current therethrough;

a feedback circuit connected to control said variable reference current to maintain voltages across said second transistor that are Just above a saturation voltage thereof, wherein said feedback circuit comprises a pair of transistors connected to mirror a current into said second driver transistor to maintain said voltages across said second transistor;

a resistor connected to receive a current from a first of said pair of transistors to provide a reference voltage thereacross, a current source connected to drive current through a second of said pair of transistors, and a dependent current source connected to pull current from gates of said second driver transistor and said pair of transistors, in dependence upon said voltages across said second transistor.

8. The circuit of claim 7 wherein said one of said voltages across said second transistor is a lower voltage across said biased element.

9. The circuit of claim 7 wherein said pair of transistors are constructed similarly to said second driver transistor.

10. The circuit of claim 7 wherein said upper and lower driver transistors are PMOS and NMOS devices, respectively.

11. The circuit of claim 7 wherein said biased element is an MR head.

12. A mass data storage device, comprising:

an MR head;

a differential amplifier having first and second driver transistors connected in series on respective opposite sides of said MR head between a positive voltage supply and a ground potential;

an upper current mirror circuit connected such that said first driver transistor mirrors a fixed drive current through said biased element;

a lower mirror circuit connected such that said second driver transistor mirrors a variable reference current therethrough;

a feedback circuit connected to control said variable reference current to maintain voltages across said second transistor that are just above a saturation voltage thereof:

wherein said feedback circuit comprises a pair of transistors connected to mirror a current into said second driver transistor to maintain said voltages across said second transistor;

a resistor connected to receive a current from a first of said pair of transistors to provide a reference voltage thereacross, a current source connected to drive current through a second of said pair of transistors, and a dependent current source connected to pull current from gates of said second driver transistor and said pair of transistors, in dependence upon said voltages across said second transistor.

13. The mass data storage device of claim 12 wherein said one of said voltages across said second transistor is a lower voltage across said biased element.

14. The mass data storage device of claim 12 wherein said pair of transistors are constructed similarly to said second driver transistor.

15. The mass data storage device of claim 12 wherein said upper and lower driver transistors are PMOS and NMOS devices, respectively.

16. The mass data storage device of claim 12 wherein said biased element is an MR head.

17. A method for providing positive biasing voltages to a biased element, comprising:

biasing respective opposite ends of said biased element with positive voltages;

feeding back a lower voltage of said positive voltages maintain a said lower voltage at a value as close as possible to a saturation voltage of a transistor for biasing said biased element, without causing said transistor to saturate, wherein said feeding back a lower voltage comprises providing a pair of transistors connected to mirror a current into a lower driver transistor to maintain said lower voltage;

connecting a resistor to receive a current from a first of said pair of transistors to provide a reference voltage thereacross, connecting a current source to drive current through a second of said pair of transistors, and pulling current from gates of said lower driver transistor and said pair of transistors with a dependent current source in dependence upon a voltage difference between said lower voltage and said reference voltage.

18. The method of claim 17 further comprising establishing a current through a biasing transistor, and mirroring said current through said biased element.

19. The method of claim 17 further comprising constructing said pair of transistors similarly to said lower driver transistor.

* * * * *